Patented Sept. 8, 1936

2,053,850

UNITED STATES PATENT OFFICE 2,053,850

PRODUCTION OF PLASTIC MATERIALS FROM PROTEINS

Oswald Sturken, Leonia, N. J., assignor to Resinox Corporation, New York, N. Y., a corporation of Delaware No Drawing. Application September 1, 1933, Serial No. 687,847

17 Claims. (Cl. 18—55)

My invention relates to improvements in the production of protein plastics. More specifically, my invention relates to the production of protein plastics which may be cured in the mold without the necessity of a prolonged cure in formaldehyde solution or formaldehyde vapor.

In the past, protein plastics such as casein plastics have found many uses in the light plastics field and have been found to be superior in a number of respects to the other molded products. For example, plastics of this nature are readily machinable, and although water-resistant from a practical standpoint, are sufficiently water-permeable to lend themselves to dyeing operations. Since these plastics are, in general, light colored materials, the advantages of this latter property are apparent. Delicate shades may be secured which are impossible to obtain with any of the molding resins, and which up to the present time, have been secured only with resins prepared from much more expensive raw materials.

However, in spite of the many advantages of the protein plastics, these materials have not, up to the present time, enjoyed the economic advantage which they appear at first glance to possess. The reason for this has been primarily the prolonged cure which has been found to be necessary. Casein sheets, for example, are cured over periods of time ranging from a matter of days to a matter of months or even a year. This obviously vastly increases the cost of the plastics. It is necessary to keep a large amount of material on hand, equipment is tied up, and it is impossible to fill rush orders if particular properties are desired which are not possessed by the plastics on hand at the time.

Many attempts have been made to secure a protein plastic which could be cured in a manner so as to obviate the difficulties previously encountered. However, up to the present time, all of these attempts have met with failure. If formaldehyde is mixed directly with the protein in any considerable concentration the reaction is extremely difficult to control and may proceed to an undesirably advanced stage before the final form of the plastic is obtained. Paraformaldehyde has been found to be very difficult to distribute throughout the protein, so that in most cases only local curing is obtained, and a weakened product results. With this material, also, the reaction has been found to be quite difficult to control. If hexamethylenetetramine is employed, a higher temperature is necessary for the cure than is necessary with formaldehyde, and at such temperatures protein plastics have a pronounced tendency to discolor or even to partially decompose. Other formaldehyde-yielding compounds, such as, for example, methylol urea, methylol ethyl urethane, formaldehyde-bisulphite compounds, etc. give final products of low strength, unduly high hydroscopicity, and generally undesirable properties. Unsuccessful attempts have also been made to produce a satisfactory plastic by incorporating with the protein and aldehyde an agent tending to slow up the rate of reaction of the aldehyde and protein. It has therefore been thought necessary to mold the protein without the addition of any formaldehyde compound, and then to cure the molded product either by soaking for a prolonged time in formaldehyde solution or by subjecting the product to the action of formaldehyde vapor for an equally long period of time.

I have now discovered that all of these prior difficulties may be obviated if certain forms of aldehyde-containing or liberating substances are utilized which maintain the greater part of the aldehyde in a physically or chemically bound state until after the plastic has been converted into the form of sheets or rods, or preferably into the final form in which it is to be used. The materials which have been found to be most suitable for this purpose are, for example, aldehyde condensation products of a resinous character containing aldehyde in a chemical or physical state such that the aldehyde is not rapidly liberated or appreciably reactive during the preliminary treatment and the forming of the protein plastic but which, on the other hand, either liberate sufficient quantities of aldehyde or become sufficiently reactive at a somewhat elevated temperature to effect a satisfactory cure of the protein plastic. It is understood, of course, that for many purposes a curing agent which acts slowly at ordinary or only moderately elevated temperatures is equally as satisfactory as one which cures quickly at elevated temperatures. In many instances a curing agent ordinarily used at elevated temperatures for rapid curing will give equally satisfactory cures at atmospheric or only moderately elevated temperatures merely by allowing the reaction to continue over a longer period of time. For reasons which will be noted hereafter it is desirable that the aldehyde condensation product be of such a character that it will cure the protein plastic between the temperatures of approximately 90° and 145° C. in a short time. Numerous aldehyde resins have been found to possess this desired property, for example, phenol-formaldehyde resins, phenol-ketone-formaldehyde resins, ketone-formaldehyde resins, urea-formaldehyde resins, acetaldehyde-phenol resins, butyraldehyde-phenol resins, and the like. Of course, it will be obvious to one skilled in the art that other aldehyde resins also will be found to be satisfactory for this purpose, provided the property of liberating aldehyde within the desired temperature range is possessed by the particular material.

Among the suitable phenol-formaldehyde resins there may be mentioned those prepared from phenol, cresol, resorcinol, cresylic acid, and the like. Various other materials may be present in these resins as long as their presence does not affect the formaldehyde liberating properties. As examples of suitable resins of the phenol-ketone-formaldehyde type there may be mentioned those prepared directly from phenols, ketones, and formaldehyde or those prepared by the reaction of formaldehyde on an intermediate product such as diphenylolpropane, as in U. S. P. 1,225,748 of Beatty. As examples of ketone-formaldehyde resins there may be mentioned the acetone-formaldehyde resins and the diacetone alcohol-formaldehyde resin of Maze, U. S. P. 1,683,835. Other types of resins are illustrated in the specific examples hereinafter given.

The reaction involved in the preparation of the plastics of this invention is not thoroughly understood. It should be made clear, therefore, that my invention is not to be limited to any particular theory by which it may operate. For example, during the molding operation, the aldehyde may not be liberated as such, but may be made available at those temperatures in the form of a partially reacted compound having free radicals which may react with the amino groups of the protein molecules. It should be understood, therefore, that when the term "liberation of formaldehyde" is used in the specification and claims it is to be taken as including any such possibilities.

The protein materials which I have found to be suitable for the present invention are crude proteins free from substantial amounts of carbohydrate or fatty material. For example, I have found corn gluten to be satisfactory if treated to remove the major part of the starch and to either remove or modify the oil content. The starch should preferably be reduced to a concentration of 6% or less, on the weight of the gluten. The oil may be removed by solvent extraction or may be modified by oxidation. The disadvantages of the presence of considerable amounts of carbohydrate or fat in the protein material are the tendency of excess fat to "sweat out" of the molded product and the tendency of either carbohydrate or fat to interfere with the plastifying of the material. Therefore, in the present specification and claims the term "substantially free from carbohydrate and fatty material" is to be understood to mean containing an insufficient amount of such materials to give rise to these difficulties. Various other protein materials of a like degree of purity may, of course, also be employed. Among these may be mentioned casein, zein, albumin, gelatin, and the like. Of all of the crude protein materials which are available for this purpose, casein has been found to be one of the most satisfactory from the standpoint of light color. However, if extremely light color is not a limiting factor, equally good products may be obtained from corn gluten or any of the other protein materials. Zein, one of the proteins associated with corn gluten, gives plastics which are particularly good from the standpoint of elasticity, plasticity and water resistance. In addition, they possess high strength, good finish and are light in color when prepared with suitable light colored resins as the hardening agents.

The process of my invention comprises, essentially, mixing with the protein material a plastifying agent, i. e., water, the aldehyde liberating condensation product, and any modifying agents such as plasticizers, lubricants, pigments, dyes, fillers, and the like, plastifying the mixture, forming the plastified material into sheets, rods, or other suitable forms, and curing. The mixing is preferably carried out in a dough mixer, the plastifying on a rubber mill, and the sheeting out in the usual heated molds or on calenders similar to those used in rubber mills, but if desired the plastifying and sheeting out may be carried out in a single operation on suitable rolls. However, the process is not limited to the use of any particular apparatus and any of the known methods for carrying out these steps of the process may, of course, be employed. When the plastic has attained its final form it is cured by heating, preferably under pressure in a suitable mold, to a sufficiently elevated temperature to liberate aldehyde from the aldehyde resin incorporated in the plastic to serve as the hardening agent. If preferred, however, and sufficient time is available the curing may be effected after forming into the desired shape, by allowing the formed material to stand for a more extended period of time at slightly elevated or even atmospheric temperatures.

As will be apparent to one skilled in the art, the time and temperature required for the plastifying and curing will depend to some extent upon the nature of the condensation product employed and the proportion of the components of the plastic. In general, it will be found to be desirable to plastify the mixture at a temperature of 50–100° C., preferably 75–85° C., and to cure at a temperature of 110–150° C., preferably 120–130° C. In any case, the particular temperatures chosen will depend upon the temperature at which the aldehyde is liberated by the condensation product. The time required for both operations will also depend upon the proportions of the ingredients and their reactivity. The nature of the protein material and the water content of the mixture will, of course, also affect the time required for this operation. The time required for the curing will depend upon the rate of reaction between the aldehyde and the protein material. Thus, a more reactive protein such as casein will require slightly less time than a less reactive material such as gluten, and a condensation product in which the excess formaldehyde or other aldehyde is relatively loosely bound will require less time than one in which the excess formaldehyde is strongly bound and slowly liberated. In general, it may be stated that from ½–15 minutes for plastifying and from 10–20 minutes for curing will be found to be satisfactory within the temperature ranges previously mentioned.

The particular proportions of ingredients employed will depend to a large extent upon the nature of the products desired. From an economic standpoint, it is desirable to utilize the minimum concentration of aldehyde condensation product which will effect the cure of product. However, if certain properties such as extreme water-resistance are desired, it may be found to be necessary to increase the content. Too high a percentage of resin, however, is generally not advisable since with increasing amounts of resin the product gradually assumes the properties of a resin and loses those of a true plastic body. The amounts of lubricants or plasticizers employed will depend upon the requirements for machining the product. For example, if the plastic is found to have a tendency to chip during machining, an increase in the plasticizer content will usually avoid this difficulty. Special fillers will be used in the proportions necessary to secure the desired change in the character of the plastic and pigments, dyes, etc. will be used in the proportions necessary to secure the desired color effect. The proportion of water or other plastifying agent in the mixture will, of course, depend upon the nature of the protein material, the character of final product desired (a final cured product containing at least 10% water being usually desirable), and upon the time the material is to be subjected to heat during plastifying. When water is used as the plastifying-agent, from 20–60%, based on the weight of the protein, will usually be found to be satisfactory. For general commercial operation, however, about 22% water or water plus 1% ammonia or acetic acid gives most satisfactory results. In general, it may be said that the proportion of aldehyde condensation product to protein material ranging from 1.0 to 25% will be found to be satisfactory, but that proportions of 5 to 10% will usually be preferable. The amount required in any case to exactly cure the plastic is difficult to determine, but it may be said, in general, that sufficient condensation product should be employed to liberate reactive aldehyde in an amount equivalent to at least 0.1% of the weight of the protein.

The products obtained by the process of my invention are in all cases hard, tough plastics having good strength and elasticity and a satisfactory finish. The materials are sufficiently tough and elastic for machining and show no tendency to gum up the tool when it becomes hot. The appearance of the products will, of course, depend upon the material employed. If a light colored condensation product, such as a water-white acetone-formaldehyde resin, and a light colored protein, such as rennet casein, are employed, the final product will be a clear, light colored to practically colorless plastic. If an ordinary light resin such as a diphenylolpropane-formaldehyde resin is employed, the final product will be a light brown, translucent plastic of pleasing appearance. The addition of white pigments to such compositions gives a practically white product which may readily be dyed according to known procedures. On the other hand, if darker colored condensation products, such as phenol-formaldehyde resins, and darker colored proteins, such as gluten are employed, these products will not, as a rule, be suitable for dyeing with light shades, but will be quite satisfactory for black or other dark colored products.

My invention may perhaps best be illustrated by the following specific examples:

Example I

A resin was prepared by mixing one part phenol and 1.1 parts of 40% formaldehyde solution, adding 4% of barium hydroxide, on the weight of the phenol, dissolved in water, heating to boiling for a few minutes, cooling to about 65° C., and vacuum distilling while raising the temperature to 85° C. until the product solidified on cooling.

The following materials were then mixed in a dough mixer:

| | Parts |
|---|---|
| Gluten | 100 |
| Formaldehyde condensation product (phenol-formaldehyde resin, prepared as above) | 10 |
| Lindol (tricresyl phosphate) | 5 |
| Water | 50 |

After thorough mixing, the composition was milled for 3 minutes at 75° C. on a rubber mill and molded into sheets at 125° C. and 2000 lbs. per sq. in. pressure for 15 minutes.

Example II

A resin was prepared in the following manner: A mixture consisting of 60 gm. acetone, 100 cc. 40% formaldehyde solution, and 2 gm. K$_2$CO$_3$ was warmed on the steam bath for about ½ hr. 100 cc. more 40% formaldehyde solution was then added, and the mixture heated on the steam bath for about 1 hr. more, with occasional shaking. Water was then added to make the volume of the mixture one liter, and the resulting composition was cooled. The resin was then ground to a coarse powder while suspended in the water, filtered off, and dried in air. Before thorough drying the material was fusible below 100° C., but when dry, the melting point was above 150° C.

The following materials were then mixed in a dough mixer:

| | Parts |
|---|---|
| Casein | 100 |
| Formaldehyde condensation product (acetone-formaldehyde resin, prepared as above) | 5 |
| Lindol (tricresyl phosphate) | 2.5 |
| Water | 30 |

After thorough mixing, the composition was milled for 3 minutes at 75° C. and molded into sheets at 120° C. and 2000 lbs. per sq. in. pressure for 15 minutes.

Example III

The following materials were mixed together in a dough mixer:

| | Parts |
|---|---|
| Gluten | 100 |
| Formaldehyde condensation product (diacetone alcohol-formaldehyde resin of The Maze patent, U. S. 1,683,835) | 5 |
| Lindol (tricresyl phosphate) | 2.5 |
| Water | 50 |

After thorough mixing, the composition was milled for 3 minutes at 75° C. and molded at 125° C. and 2000 lbs. per sq. in. pressure for 15 minutes.

Example IV

The following materials were mixed together in a dough mixer:

| | Parts |
|---|---|
| Casein | 100 |
| Formaldehyde condensation product (diphenylolpropane-formaldehyde resin of the Beatty patent, U. S. 1,225,748) | 5 |
| Lindol (tricresyl phosphate) | 2.5 |
| Water | 30 |

After thorough mixing, the composition was milled for 3 minutes at 75° C. and molded into sheets at 125° C. and 2000 lbs. per sq. in. pressure for 15 minutes. The transverse strength of the resulting plastic was found to be 14,000 lbs. per sq. in.

Example V

The following materials were mixed together in a dough mixer:

| | Parts |
|---|---|
| Gluten | 100 |
| Formaldehyde condensation product (the resin of Example IV) | 5 |
| Lindol (tricresyl phosphate) | 2.5 |
| Water | 50 |

After thorough mixing, the composition was milled for 3 minutes at 75° C. and molded into sheets at 125° C. and 2000 lbs. per sq. in. pressure for 15 minutes. The transverse strength of the resulting plastic was found to be 11,000 lbs. per sq. in.

Example VI

A resin was prepared in the following manner: A mixture of 15 gm. urea, 37 cc. 40% formaldehyde solution, and 1 gm. $K_2CO_3$ was allowed to stand for 2 days at room temperature. It was then acidified with $H_2SO_4$, heated to boiling for about 5 minutes, and allowed to stand for an hour. The resulting resin was filtered off, washed, and dried in air.

The following materials were then mixed in a dough mixer:

| | Parts |
|---|---|
| Gluten | 100 |
| Formaldehyde condensation product (urea-formaldehyde resin, prepared as above) | 5 |
| Lindol (tricresyl phosphate) | 2.5 |
| Water | 50 |

After thorough mixing, the composition was milled for 3 minutes at 75° C. and molded into sheets at 125° C. and 2000 lbs. per sq. in. pressure for 15 minutes. The transverse strength of the resulting plastic was found to be 8,400 lbs. per sq. in.

Example VII

A resin was prepared by first reacting one mol alpha ethyl beta propyl acrolein with three mols phenol at approximately 80° C. in the presence of hydrochloric acid as catalyst. After removing the catalyst and unreacted catalyst the resulting product was refluxed with aqueous formaldehyde in the proportion of approximately 0.35 mol formaldehyde per mol of phenol reacted in producing the intermediate. The resulting material was alpha ethyl beta propyl acrolein-phenol-formaldehyde resin.

The following materials were then mixed in a dough mixer:

| | Parts |
|---|---|
| Gluten | 100 |
| Alpha ethyl beta propyl acrolein-phenol-formaldehyde resin | 5 |
| Lindol (tricresyl phosphate) | 2.5 |
| Water | 40 |

After thorough mixing, the composition was milled for 3 minutes at 75° C. and molded into sheets at 125° C. and 2000 lbs. per sq. in. pressure for 15 minutes.

Example VIII

A condensation product was prepared by reacting a mixture of beta.beta-bis-[4-hydroxyphenyl]-propane and beta.beta-bis[4-hydroxyphenyl]-propane-acetone condensation product in the presence of a barium hydroxide catalyst with approximately one mol of formaldehyde per mol of phenol in said mixture.

The following materials were then mixed in a dough mixer:

| | Parts |
|---|---|
| Titanium dioxide | 10 |
| Formaldehyde-acetone-phenol condensation product, prepared as above | 5 |
| Lindol (tricresyl phosphate) | 2 |
| Water | 40 |
| Titanium dioxide | 10 |

After thoroughly mixing separately the liquid and solid components, the two portions were mixed in a dough mixer. The product thus obtained was next milled on a calender roll at atmospheric temperature for about 10–12 minutes. The sheets thus obtained were then cured at 125° C. and 2000 lbs. per sq. in. pressure for 15 minutes. The transverse strength of the resulting plastic was in excess of 11,000 lbs. per sq. in.

The procedures just outlined may, of course, be varied somewhat. For example, instead of curing for a short period of time at elevated temperatures and pressures, the curing may be begun in this manner and completed by heating for a more extended period of time at a lower temperature, say 80° C. Or, in some cases, it may be preferred to carry out the entire curing operation at such a lower temperature.

It is to be understood, of course, that the above examples are illustrative only and are not to be taken as limiting the invention to the particular compounds or proportions specified. For example, proteins other than gluten, casein, and zein, may be employed, e. g., soy-bean protein, gelatin, albumin, and the like. Also, various other aldehyde condensation products such as cresol-formaldehyde resins, cresol-acetone-formaldehyde resins, and other formaldehyde resins of a similar nature may be employed. Plastifying agents other than water may also be used. In general, any material which is either a solvent for the protein or which serves to give a colloidal suspension thereof may be employed. Cresols or phenols, for example, may be used instead of water if the odor of the final product is of little importance. Any of the known modifying agents, i. e., plasticizers such as diethyl phthalate, dibutyl phthalate, lubricants such as zinc stearate, and the like, may be employed in place of or in addition to lindol which was specifically mentioned. Pigments, other than titanium dioxide may, of course, also be employed. Such pigments as zinc oxide, titanox, and the like, will be found to be satisfactory, but it is preferable to use titanium dioxide from the standpoint of using a minimum quantity of inert material which tends to weaken the plastic if present in large amounts. In general, it may be said that known equivalents and any modifications of procedure which would occur to one skilled in the art may be employed without departing from the scope of this invention.

Having now described my invention, what I claim is:

1. In the production of plastics in which the organic binder constitutes at least 75% protein, the method of curing which comprises mixing the protein with less than 25% by weight of a resinous aldehyde condensation product which is capable of liberating substantial amounts of reactive aldehyde at elevated temperatures, plastifying said mixture, both said mixing and plastifying operations being effected at temperatures such that substantial amounts of aldehyde are not liberated during the periods of mixing and plastifying, and curing the resulting mass at a temperature sufficiently high to liberate substantial amounts of reactive aldehyde during the period of curing.

2. In the production of plastics in which the organic binder constitutes at least 75% protein, the method of curing which comprises mixing the protein, in a substantially fat-free and carbohydrate-free condition, with less than 25% by weight of a resinous aldehyde condensation product which does not liberate substantial amounts of reactive aldehyde during the period and at the temperature attained in the plastifying operation but which liberates aldehyde at the temperature and during the period of cure, plastifying said mixture, both said mixing and plastifying operations being effected at temperatures such that substantial amounts of aldehyde are not liberated during the periods of mixing and plastifying, and curing the resulting mass at a temperature sufficiently high to liberate substantial amounts of reactive aldehyde during the period of curing.

3. In the production of plastics in which the organic binder constitutes at least 75% casein, the method of curing which comprises mixing the casein with less than 25% by weight of a resinous aldehyde condensation product which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

4. In the production of plastics in which the organic binder constitutes at least 75% zein, the method of curing which comprises mixing the zein with less than 25% by weight of a resinous aldehyde condensation product which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

5. In the production of plastics in which the organic binder constitutes at least 75% gluten, the method of curing which comprises mixing the gluten, in a substantially fat-free and carbohydrate-free condition, with less than 25% by weight of a resinous aldehyde condensation product which does not liberate substantial amounts of reactive aldehyde during the period and at the temperature attained in the plastifying operation but which liberates aldehyde at the temperature and during the period of cure, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

6. In the production of plastics in which the organic binder constitutes at least 75% protein, the method of curing which comprises mixing the protein with less than 25% by weight of a resin of the phenol-formaldehyde type which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

7. In the production of plastics in which the organic binder constitutes at least 75% protein, the method of curing which comprises mixing the protein with less than 25% by weight of a resin of the phenol-ketone-aldehyde type which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

8. In the production of plastics in which the organic binder constitutes at least 75% protein, the method of curing which comprises mixing the protein with less than 25% by weight of a resin of the formaldehyde-urea type which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

9. In the production of plastics in which the organic binder constitutes at least 75% protein, the method of curing which comprises mixing the protein with less than 25% by weight of a resin of the alpha ethyl beta propyl acrolein-phenol-formaldehyde type which is capable of liberating substantial amounts of reactive aldehyde at elevated temperatures, plastifying said mixture, forming the plastified mass into suitable shapes, the said mixing, plastifying, and forming operations being effected at temperatures such that substantial amounts of aldehyde are not liberated during the periods of mixing, plastifying, and forming and curing the shaped masses at a temperature sufficiently high to liberate substantial amounts of reactive aldehyde during the period of curing.

10. In the production of plastics in which the organic binder constitutes at least 75% protein, the method of curing which comprises mixing the protein, at a temperature substantially below 90° C., with less than 25% by weight of a resinous aldehyde condensation product which does not liberate substantial amounts of reactive aldehyde below 90° C. but which liberates aldehyde in the reactive state within the range 90–145° C. and at atmospheric temperatures over extended periods of time, plastifying the mixture at a temperature below 90° C., forming the plastified mass into suitable shapes, and curing the shaped masses at a temperature within the range 90–145° C.

11. In the production of plastics in which the organic binder constitutes at least 75% protein, the method of curing which comprises mixing the protein, at a temperature substantially below 90° C., with less than 25% by weight of a resinous aldehyde condensation product which does not liberate substantial amounts of reactive aldehyde below 90° C. but which liberates aldehyde in the reactive state within the range 90–145° C. and at atmospheric temperatures over extended periods of time, plastifying the mixture in the presence of in excess of 20% water at a temperature below 90° C., forming the plastified mass into suitable shapes, and curing the shaped masses at a temperature within the range 90–145° C.

12. In the production of plastics in which the organic binder constitutes at least 75% protein, the method of curing which comprises mixing the protein, at a temperature substantially below 90° C., with less than 25% by weight of a resinous aldehyde condensation product which does not liberate substantial amounts of reactive aldehyde below 90° C. but which liberates aldehyde in the reactive state within the range 90–145° C. and at atmospheric temperatures over extended periods of time, plastifying the mixture by milling in the presence of 20–60% of water at a temperature below 90° C., forming the plastified mass into suitable shapes, and curing the shaped masses at a temperature within the range 90–145° C.

13. A protein plastic composition comprising the reaction product of a mixture comprising essentially protein and a potentially reactive heterogeneous resinous aldehyde condensation product of the type which does not liberate substantial amounts of reactive aldehyde below 90° C. but which liberates aldehyde in a reactive state within the temperature range 90–145° C., the proportion of resinous material to protein ranging from 1% to 25%.

14. A protein plastic composition comprising the reaction product of a mixture comprising essentially casein and a potentially reactive heterogeneous resinous aldehyde condensation product of the type which does not liberate substantial amounts of reactive aldehyde below 90° C. but which liberates aldehyde in a reactive state within the temperature range 90–145° C., the proportion of resinous material to casein ranging from 1% to 25%.

15. A protein plastic composition comprising the reaction product of a mixture comprising essentially zein and a potentially reactive heterogeneous resinous aldehyde condensation product of the type which does not liberate substantial amounts of reactive aldehyde below 90° C. but which liberates aldehyde in a reactive state within the temperature range 90–145° C., the proportion of resinous material to zein ranging from 1% to 25%.

16. A protein plastic composition comprising the reaction product of a mixture comprising essentially gluten and a potentially reactive heterogeneous resinous aldehyde condensation product of the type which does not liberate substantial amounts of reactive aldehyde below 90° C. but which liberates aldehyde in a reactive state within the temperature range 90–145° C., the proportion of resinous material to gluten ranging from 1% to 25%.

17. A protein plastic composition consisting essentially of the reaction product of protein and a potentially reactive heterogeneous resinous aldehyde condensation product of the type which does not liberate substantial amounts of reactive aldehyde below 90° C. but which liberates aldehyde in a reactive state within the temperature range 90–145° C., the proportion of resinous material to protein ranging from 1% to 25%.

OSWALD STURKEN.

CERTIFICATE OF CORRECTION.

Patent No. 2,053,850.　　　　　　　　　　　　　　　　　September 8, 1936.

OSWALD STURKEN.

It is hereby certified that error appears in the printed specification of the above numbered patent requiring correction as follows: Page 3, second column, line 16, for "actone" read acetone; page 4, second column, line 4, for "Titanium dioxide------------10" read Zein-------------100; page 5, first column, lines 10 to 14 inclusive, claim 2, and lines 60 to 64 inclusive, claim 5, strike out the words "does not liberate substantial amounts of reactive aldehyde during the period and at the temperature attained in the plastifying operation but which liberates aldehyde at the temperature and during the perio of cure" and insert instead is capable of liberating substantial amounts of reactive aldehyde at elevated temperatures; and that the said Letters Patent should be read with these corrections therein that the same may conform to the record of the case in the Patent Office.

Signed and sealed this 15th day of December, A. D. 1936.

Henry Van Arsdale (Seal)　　　　　　　　　　　　　　　　　　　　　　Acting Commissioner of Patents.